United States Patent [19]
Gilson

[11] 3,714,838
[45] Feb. 6, 1973

[54] SHEAVE FOR RATCHET BLOCK

[76] Inventor: Robert E. Gilson, 4 North Franklin Avenue, Madison, Wis. 53713

[22] Filed: Sept. 11, 1970

[21] Appl. No.: 71,568

[52] U.S. Cl. ............74/230.24, 74/230.05, 74/230.5, 74/229, 254/190 R
[51] Int. Cl. .............................................. F16h 55/36
[58] Field of Search........74/230.01, 230.05, 230.24, 74/230.3, 229; 254/190, 192; 188/82.3, 82.7

[56] References Cited

UNITED STATES PATENTS

| 2,875,981 | 3/1959 | Hunter | 74/230.01 |
| 3,528,645 | 9/1970 | Harken | 254/192 |
| 3,302,932 | 2/1967 | Wallin | 74/230.5 |
| 2,749,759 | 6/1956 | Kienhofer | 74/230.24 |
| 2,922,310 | 1/1960 | Anderson | 74/230.3 |

FOREIGN PATENTS OR APPLICATIONS 1,096,059  12/1954  France ..........................74/230.01

Primary Examiner—C. J. Husar
Attorney—Russell W. Pyle

[57] ABSTRACT

The line-receiving groove of the sheave includes a plurality of opposed inwardly converging shoulders on the sides of the groove and a coplanar corner in the innermost portion of the groove. The configuration is especially adaptable to ratchet blocks in that little effort is required to hold the line against a strong pull, and the line may be easily released in the direction of pull without binding or undue wear.

11 Claims, 4 Drawing Figures

PATENTED FEB 6 1973
3,714,838
Fig.1.
Fig.2.
Fig.3.
Fig.4.
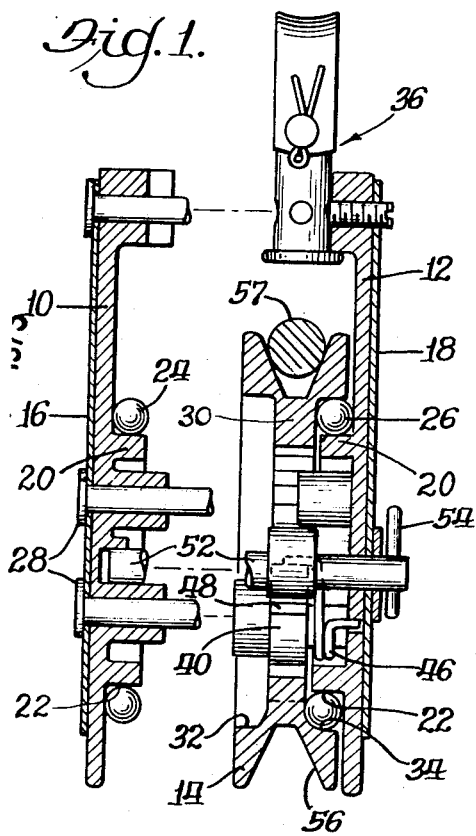
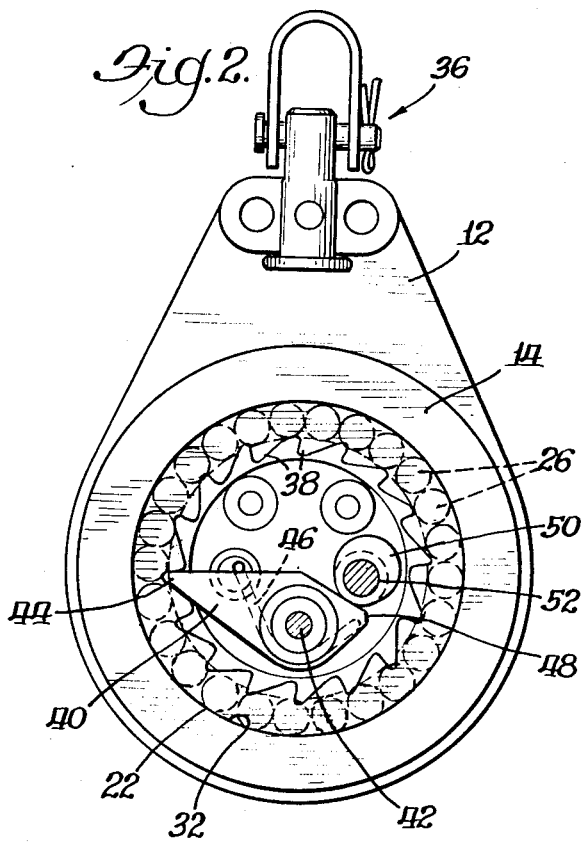
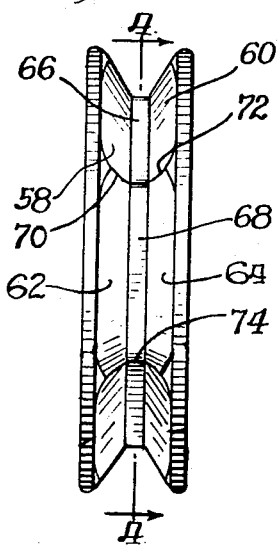
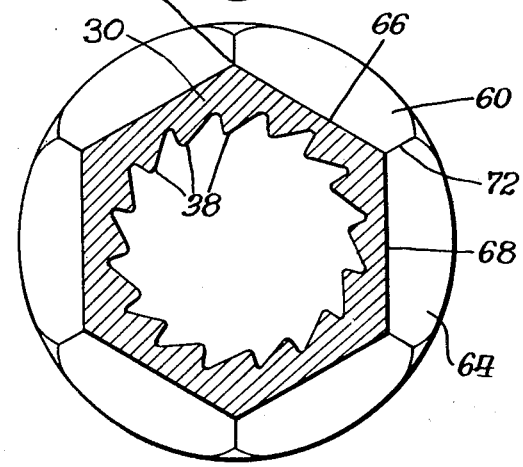
Inventor:
Robert E. Gilson
By Russell W. Pyle
Attorney.

SHEAVE FOR RATCHET BLOCK

This invention relates to a bearing or pulley blocks for rotatably carrying a flexible line of round cross section and more particularly to an improvement in the line-carrying groove in the sheave of such pulley blocks.

In a conventional pulley, a sheave is rotatably mounted in a support, and the sheave is provided with an outer groove adapted for carrying and rotatably supporting a flexible line. In order to prevent slippage between the line and the sheave, it is known to roughen the groove or provide sharp edges or teeth therein to increase the sliding friction between the line and sheave. It is also common to employ a groove with a V-shaped configuration, whereby the line is wedged deeper into the groove as tension on the line is increased.

Additional factors, however, become important in applications where it is necessary to grip the line as well as to allow the line to slip in the groove of the sheave. An example of such application is a ratchet block used on sailboats where rotational movement of the sheave is or may be limited to one direction. The ratchet block allows a line to be drawn freely in one direction, and friction between the line and sheave enables controlled slippage of the line over the stationary sheave in the other direction. The use of roughened surfaces, sharp edges or V-shaped configurations in the groove of ratchet blocks has not proven entirely satisfactory, because of excessive wear on the line and binding of the line in the groove.

Accordingly, an object of the present invention is to provide a pulley sheave with the capability of positively gripping a line under tension as well as the capability of releasing the line when tension is eased.

Another object is the provision of such a pulley sheave configuration that will not cause undue wear on or bind the line.

Other objects will become apparent from the following description and appended claims, taken in connection with the accompanying drawing, wherein:

FIG. 1 is a transverse vertical sectional view, shown partially disassembled, of a ratchet block that incorporates features of the presently described invention;

FIG. 2 is a vertical sectional view taken along section line 2—2 in FIG. 1;

FIG. 3 is an isolated plan view of the improved sheave illustrated in FIGS. 1 and 2; and FIG. 4 is a cross sectional view taken along line 4—4 of FIG. 3.

In FIGS. 1 and 2, a particular ratchet block is shown, although it will be understood that the improved sheave described herein is equally adaptable to any known rotational support arrangement capable of preventing rotation of the sheave or other line carrying member in one direction. As shown, the block comprises a pair of interconnected side plates 10 and 12 with an annular sheave 14 rotatably mounted therebetween. Outer side plates 16 and 18 may be additionally provided for extra strength.

A shaft between the lower portions of the side plates 10 and 12 is formed by annular shoulders 20 and 22, projecting toward one another from respective side plates 10 and 12 and defining respective annular races upon which respective ball bearing sets 24 and 26 are received. Suitable fasteners 28, such as bolts, rivets, or the like, are provided in the area of the shoulders to hold the side plates together. The sheave 14 includes a central web 30 extending radially inward separating adjacent sets of ball bearings 24 and 26. Annular shoulders 32 and 34 on the sheave define respective outer annular races for the ball bearing sets 24 and 26. The block is designed such that the ball bearing sets 24 and 26 contact the inner surfaces of their respective adjacent side plates 10 and 12 as well as the inner and outer races. An upper portion of the block may be provided with a rotatably and pivotable shackle arrangement generally indicated at 36.

Means are provided to prevent rotation of the sheave in one rotational direction, such means taking the form of a cam and ratchet assembly in the preferred embodiment shown. A plurality of inclined teeth 38 are provided on the innermost portion of the central web 30. A pawl 40 is rotatably mounted intermediate its ends around an axis 42 offset from the rotational axis of the sheave 14. One end 44 of the pawl is engageable with the teeth 38, and a coil spring 46 is connected between the pawl and one of the side plates, to resiliently urge said end of the pawl into engagement with the teeth. The other end 48 of the pawl 40 is beveled for coaction against a round cam 50 eccentrically secured on a pin 52 rotatably mounted between the side plates 10 and 12. The pin 52 extends externally of one of the side plates to a handle 54, in order to enable rotation of the cam 50 externally of the block.

When the cam 50 is in the position shown, the spring loaded pawl 40 is allowed to contact and resiliently ride over the inclined teeth 38 during rotation of the sheave in one direction, in this instance a clockwise direction. Rotation in the other or counterclockwise direction is prevented by engagement of the pawl end 44 between the inclined teeth 38. Upon rotation of the cam 50 by turning the handle 54, the end 44 of the pawl is rotated away from and withdrawn from engagement with the inclined teeth 36, thereby allowing the sheave to rotate freely in both directions.

As best shown in FIGS. 1, 3 and 4, the sheave 14 has an open groove 56 in the outer periphery thereof in which a flexible round line 57 is received (FIG. 1). The groove 56 is substantially V-shaped and is specially formed to enable gripping and release of the line without encountering the problems hereinbefore described. The groove 56 is shaped in the form of a plurality of identical and interconnected prismatic notches, with adjacent notches having common trapezoidal bases. The notches are preferably six in number, although other numbers in the range of four to ten notches may be employed.

Each notch comprises opposed flat planar side surfaces, such as 58 and 60, and 62 and 64 in the sides of the groove 56, said surfaces converging inward toward one another and connected by respective flat planar or concave bottom surfaces 66 and 68 at the bottom of the groove. Adjacent contiguous side surfaces, such as 58 and 62, and 60 and 64, define therebetween opposed inwardly tapering shoulders 72 and 72, respectively, while corresponding adjacent bottom surfaces 66 and 68 define a coplanar corner 74 connecting said shoulders at the bottom of said groove, said corner being substantially parallel to the axis of rotation of the sheave. The inner groove of the sheave therefore comprises a plurality of interconnected chordal surfaces or portions, such as 66 and 68, which define line-gripping corners 74.

In normal operation, the line is wrapped around 25 to 55 percent of the circumference of the sheave, such that the line is capable of contacting at least one of the corners 74 when sufficient line tension is applied, whereby the line is firmly gripped. As tension is eased, the line gradually moves out of contact with the corners 74 and rides up between the shoulders 72 and 72, thereby permitting controlled release of the line.

I claim:

1. In a pulley block having a sheave rotatably mounted therein, said sheave having a line-receiving groove, the improvement wherein the side surfaces of said line-receiving groove taper inwardly toward the bottom of said groove, and the bottom of said groove comprises a plurality of upstanding obtuse corners extending between said side surfaces and spaced around the circumference of said groove, such that a line received in said groove rides up between the side surfaces of said groove in the absence of substantial tension thereon, and said line engages at least one of said corners under application of tension thereto.

2. The improvement of claim 1 wherein the bottom of said groove comprises a plurality of interconnected chordal portions that define said corners.

3. The improvement of claim 2 wherein the sides of said groove each comprise a plurality of interconnected side surfaces defining raised corners therebetween, said corners extending radially from the bottom of said groove.

4. The improvement of claim 3 wherein adjacent chordal portions at the bottom of said groove and corresponding adjacent surfaces at each side of the groove are interconnected in substantially the same plane.

5. The improvement of claim 3 wherein said chordal surfaces and said side surfaces are substantially planar.

6. The improvement of claim 1 wherein means are provided for limiting rotation of said sheave in one direction.

7. An apparatus for carrying a flexible line comprising a rotatable member, means for rotatably mounting said member about its axis, and a continuous groove around the outer surface of said member for receiving a flexible line, the bottom of said groove having a plurality of upstanding obtuse corners disposed around the circumference thereof, such that a line carried in said groove rides over said corners freely in the absence of substantial tension thereon and engages and grips against at least one of said corners under application of tension thereto.

8. The apparatus of claim 7 wherein said corners are at least four in number and are disposed substantially along a line parallel to the axis of said member.

9. The apparatus of claim 7 wherein means are provided for limiting rotation of said member to one direction.

10. The apparatus of claim 7 wherein said corners are defined by interconnected chordal surfaces at the bottom of said groove.

11. An apparatus for carrying a flexible line comprising a generally cylindrical member, means for rotatably mounting said member about its axis, and a continuous, inwardly tapered line-receiving groove formed around and within the cylindrical surface of said member, said groove having a bottom comprising interconnected chordal portions defining at least four raised corners spaced around the bottom of said groove such that a line received therein engages and grips against at least one of said corners under application of tension to said line and rides up in said groove and away from said corners upon release of tension from said line.

* * * * *